US008982759B2

(12) United States Patent
Kim et al.

(10) Patent No.: US 8,982,759 B2
(45) Date of Patent: Mar. 17, 2015

(54) SYSTEM INFORMATION TRANSMITTING AND RECEIVING DEVICE

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 859 days.

(21) Appl. No.: 13/144,691

(22) PCT Filed: Jan. 15, 2010

(86) PCT No.: PCT/KR2010/000247
§ 371 (c)(1),
(2), (4) Date: Jul. 14, 2011

(87) PCT Pub. No.: WO2010/082775
PCT Pub. Date: Jul. 22, 2010

(65) Prior Publication Data
US 2011/0274102 A1  Nov. 10, 2011

Related U.S. Application Data

(60) Provisional application No. 61/145,073, filed on Jan. 15, 2009, provisional application No. 61/154,768, filed on Feb. 24, 2009.

(51) Int. Cl.
*H04W 4/00* (2009.01)
*H04L 5/00* (2006.01)
*H04W 72/04* (2009.01)
*H04L 1/00* (2006.01)

(52) U.S. Cl.
CPC ........... *H04L 5/0053* (2013.01); *H04W 72/042* (2013.01); *H04L 1/0072* (2013.01); *H04L 5/0007* (2013.01)
USPC ............................ 370/312; 370/350; 370/310

(58) Field of Classification Search
CPC .. H04B 7/0452; H04W 72/042; H04W 24/02; H04W 72/04; H04L 1/0072; H04L 5/0053; H04L 5/0007
See application file for complete search history.

(56) References Cited

U.S. PATENT DOCUMENTS

| | | |
|---|---|---|
| 2007/0002724 A1 | 1/2007 | Khan |
| 2008/0085716 A1 | 4/2008 | Chang |
| 2010/0041445 A1* | 2/2010 | Qi et al. ........................ 455/574 |
| 2010/0046651 A1* | 2/2010 | Jongren ........................ 375/260 |
| 2010/0284347 A1* | 11/2010 | Ahn et al. .................... 370/329 |
| 2011/0216731 A1* | 9/2011 | Frederiksen et al. ......... 370/329 |

FOREIGN PATENT DOCUMENTS

WO  2008/053321  5/2008

* cited by examiner

*Primary Examiner* — Khaled Kassim
*Assistant Examiner* — Zhaohui Yang
(74) *Attorney, Agent, or Firm* — Lee, Hong, Degerman, Kang & Waimey

(57) ABSTRACT

Disclosed are a device and method for transmitting or receiving the system information. The system information transmitting device comprises a processor for transmitting the system information on a broadcast channel, and the system information comprises multi-carrier information relating to a multi-carrier operation. The present invention allows additional information elements to be included in the system information, while also providing backward compatibility with legacy systems.

8 Claims, 8 Drawing Sheets

SYSTEM INFORMATION TRANSMITTING AND RECEIVING DEVICE

CROSS-REFERENCE TO RELATED APPLICATIONS

This application is the National Stage filing under 35 U.S.C. 371 of International Application No. PCT/KR2010/000247, filed on Jan. 15, 2010, which claims the benefit of U.S. Provisional Application Serial Nos. 61/154,768, filed on Feb. 24, 2009, and 61/145,073, filed on Jan. 15, 2009, the contents of which are all hereby incorporated by reference herein in their entirety.

TECHNICAL FIELD

The present invention relates to wireless communication, and more particularly, to an apparatus and method for transmitting or receiving system information in a wireless communication system.

BACKGROUND ART

3GPP ($3^{rd}$ Generation Partnership Project) LTE (long term evolution) based on 3GPP TS (Technical Specification) Release 8 is a leading next-generation mobile communication standard.

As described in 3GPP TS 36.211 V8.4.0 (2008-09) "Evolved Universal Terrestrial Radio Access (E-UTRA); Physical Channels and Modulation (Release 8)", in LTE, physical channels can be divided into a PDSCH (Physical Downlink Shared Channel) and a PUSCH (Physical Uplink Shared Channel) (i.e., data channels) and a PDSCH (Physical Downlink Control Channel) and a PUCCH (Physical Uplink Control Channel) (i.e., control channels).

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

Schemes additionally being discussed in 3GPP LTE-A (Advanced) (i.e., an evolution of 3GPP LTE) include multiple carriers, a relay, MIMO (Multiple Input Multiple Output), CoMP (Coordinated Multi-Point transmission) and the like.

With the introduction of the additional schemes, additional information elements need to be included in the system information.

As the amount of the system information is increased, it is necessary to design a channel which is used to transmit the system information by taking compatibility with the existing system into account.

DISCLOSURE

Technical Problem

The present invention provides an apparatus and method for transmitting system information.

The present invention also provides an apparatus and method for receiving system information.

Technical Solution

In an aspect, a base station comprises a radio frequency unit and a processor coupled to the radio frequency unit and configured to transmit system information through a broadcast channel, wherein the system information comprises multiple carrier information related to a multiple carrier operation.

The multiple carrier information may comprise at least one of the number of multiple carriers which are used by a system, a carrier index, and the type of a carrier.

The multiple carrier information may comprise a non-Physical Hybrid automatic repeat request (HARQ) Indicator Channel (PHICH) indicator, indicating a carrier through which a PHICH used to transmit a downlink HARQ ACK/NACK signal is not transmitted.

The system information may comprise the number of transmission antennas used for downlink transmission.

The broadcast channel may be an S-PBCH (Secondary Physical Broadcast Channel). The S-PBCH may be transmitted through at least one of 10 subframes in a radio frame.

A subframe may comprise a plurality of OFDM (orthogonal frequency division multiplexing) symbols. The S-PBCH may be transmitted through at least one of the remaining OFDM symbols from among the plurality of OFDM symbols except preceding 3 OFDM symbols and OFDM symbols used to transmit a secondary synchronization signal, a primary synchronization signal, and PBCHs.

In another aspect, a user equipment comprises a radio frequency unit and a processor coupled to the radio frequency unit and configured to receive system information through a broadcast channel and to communicate with a base station based on the system information, wherein the system information comprises multiple carrier information related to a multiple carrier operation.

Advantageous Effects

Additional information elements can be included in system information while providing backward compatibility with a legacy system. Furthermore, there is provided the structure of a channel capable of transmitting extension system information.

MODE FOR INVENTION

Figure 1:
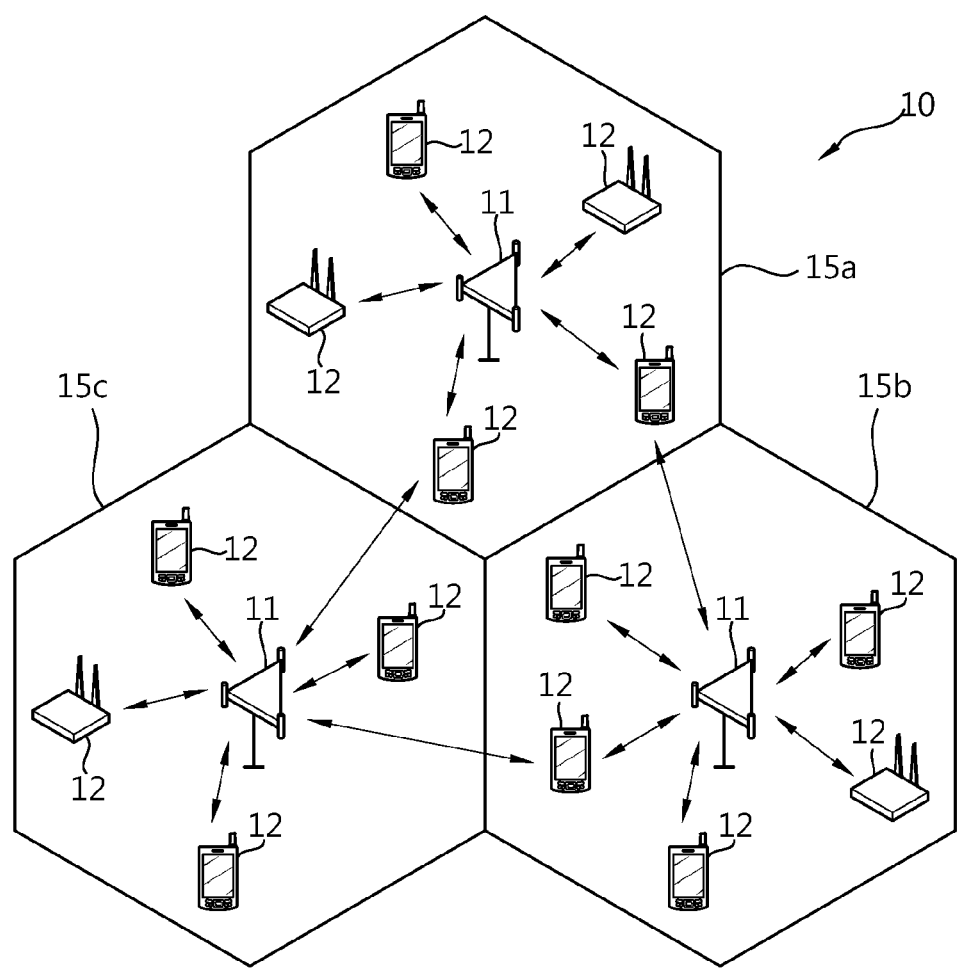
FIG. 1 shows a wireless communication system.

FIG. 1 shows a wireless communication system. The wireless communication system 10 includes one or more Base Stations (BS) 11. The BSs 11 provide communication services to specific geographical areas (commonly called a cell) 15a, 15b, and 15c, respectively. The cell may be divided into a number of areas (called sectors).

A User Equipment (UE) 12 may be fixed or mobile. The UE may be called another terminology, such as an MS (mobile station), an MT (mobile terminal), a UT (user terminal), an SS (subscriber station), a wireless device, a PDA (personal digital assistant), a wireless modem, or a handheld device.

The BS 11 chiefly refers to a fixed station which communicates with the UE 12. The BS may also be called another terminology, such as an eNB (evolved-NodeB), a BTS (Base Transceiver System), or an access point.

Hereinafter, downlink refers to communication from a BS to a UE, and uplink refers to communication from a UE to a BS. In downlink, a transmitter may be part of a BS, and a receiver may be part of a UE. In uplink, a transmitter may be part of a UE, and a receiver may be part of a BS.

Figure 2:
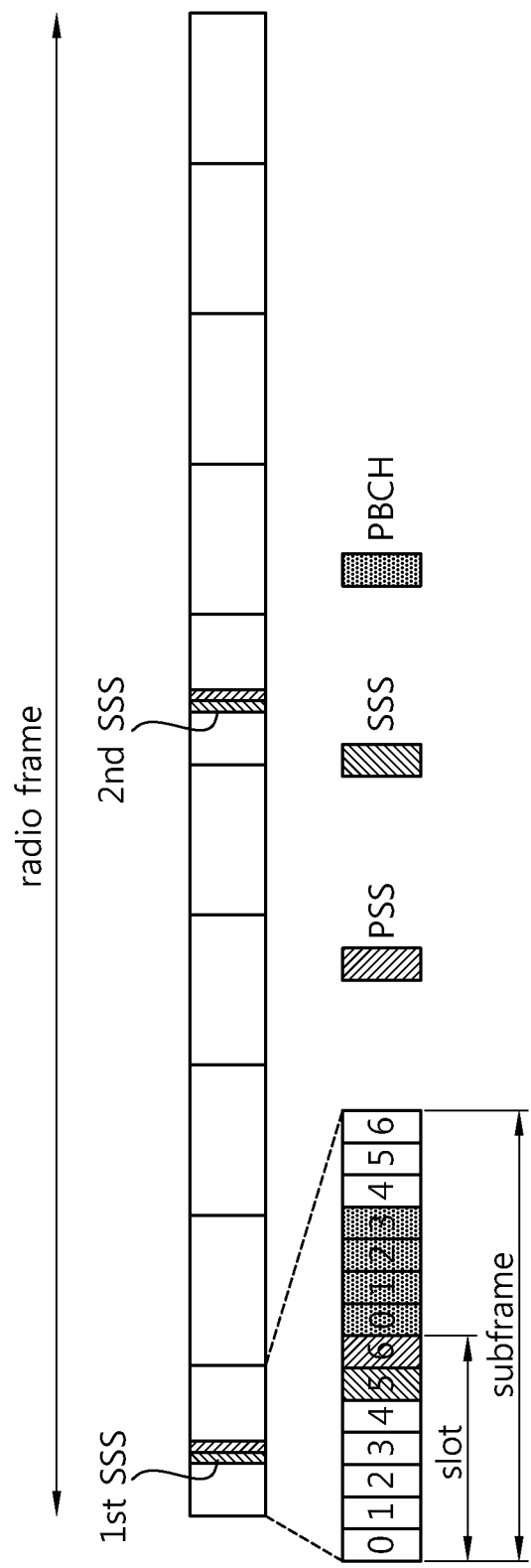
FIG. 2 shows the structure of a radio frame in 3GPP LTE.

FIG. 2 shows the structure of a radio frame in 3GPP LTE. For the structure of the radio frame, reference can be made to Section 6 of 3GPP TS 36.211 V8.5.0 (2008-12). The radio frame consists of 10 subframes assigned respective indices 0 to 9. One subframe consists of 2 slots. The time taken to transmit one subframe is called a TTI (transmission time interval). For example, the length of one subframe may be 1 ms, and the length of one slot may be 0.5 ms.

One slot may include a plurality of OFDM (orthogonal frequency division multiplexing) symbols in the time domain. The OFDM symbol is used to represent one symbol period in the time domain because 3GPP LTE adopts OFDMA in downlink. The OFDM symbol may be called another terminology. For example, the OFDM symbol may be called an SC-FDMA symbol if SC-FDMA is used as an uplink multiple access method.

One slot is illustrated to include 7 OFDM symbols, but the number of OFDM symbols included in one slot may be changed according to the length of a CP (Cyclic Prefix). In accordance with 3GPP TS 36.211, one subframe includes 7 OFDM symbols in a normal CP, and one subframe includes 6 OFDM symbols in an extended CP.

A PSS (Primary Synchronization Signal) is transmitted through the first slot (i.e., the first slot of a first subframe (a subframe having an index 0)) and the last OFDM symbol of an eleventh slot (i.e., the first slot of a sixth subframe (a subframe having an index 5)). The PSS is used to obtain OFDM symbol synchronization or slot synchronization and is associated with a physical cell ID (identity). A PSC (Primary Synchronization Code) is a sequence used for the PSS. Three PSCs are included in 3GPP LTE. One of three PSC is transmitted as the PSS according to a cell ID. The same PSC is used in the last OFDM symbols of a first slot and a eleventh slot.

An SSS (Secondary Synchronization Signal) includes a first SSS and a second SSS. The first SSS and the second SSS are transmitted through OFDM symbols contiguous to OFDM symbols through which a PSS is transmitted. The SSS is used to obtain frame synchronization. The SSS, together with the PSS, is used to obtain a cell ID. The first SSS and the second SSS use different SSCs (Secondary Synchronization Codes). Assuming that each of the first SSS and the second SSS includes 61 subcarriers, two SSCs each having a length of 31 are used in the first SSS and the second SSS.

A PBCH (Physical Broadcast Channel) is transmitted over the preceding four OFDM symbols of the second slot of a first subframe. The PBCH carries essential system information which is necessary for a UE to communicate with a BS. System information transmitted through the PBCH is called an MIB (master information block). On the other hand, system information transmitted through a PDCCH (Physical Downlink Control Channel) is called an SIB (system information block).

Figure 3:
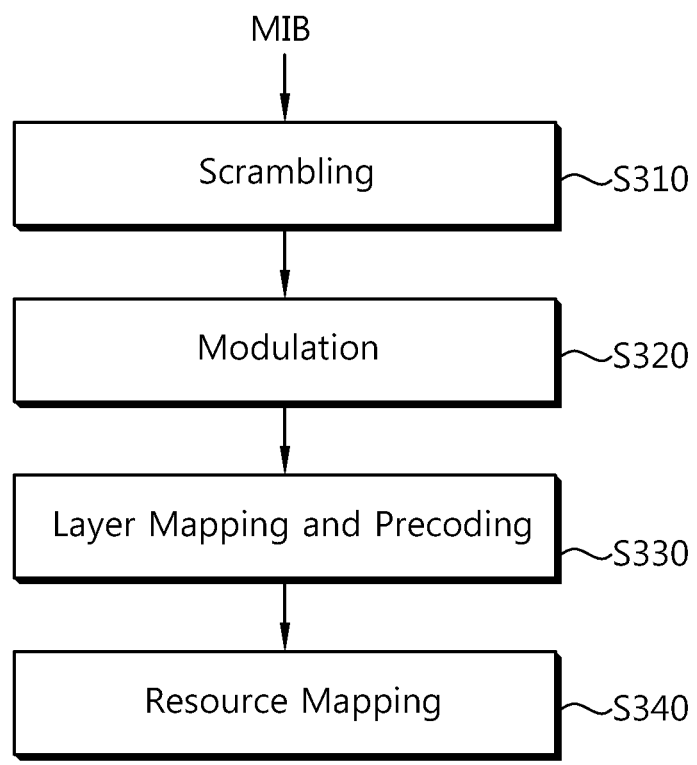
FIG. 3 shows the configuration of a PBCH.

FIG. 3 shows the configuration of a PBCH. An MIB is subjected to encoding and rate matching and then scrambled into a scrambling code (S310). The scramble code is generated on the basis of a cell ID.

The scrambled MIB is modulated according to QPSK (Quadrature Phase Shift Keying), so that modulation symbols are generated (S320).

The modulation symbols are mapped to a layer and precoded, so that a symbol for each transmission antenna is generated (S330).

The symbol for the transmission antenna is mapped to an RE (resource element) (k,l) (S340). k is a subcarrier index, and l is the OFDM symbol index of the second slot of a first subframe (i.e., subframe having an index 0). In the RE index (k,l), k and l are expressed as in the following equation.

$$k = \frac{N_{RB}^{DL} N_{sc}^{RB}}{2} - 36 + k', l = 0, 1, 2, 3 \qquad \text{Equation 1}$$

In the above equation, k'=0, 1, 2, 3, $N^{DL}_{RB}$ is the number of resource blocks in the entire system bandwidth, and $N^{RB}_{sc}$ is the number of subcarriers per resource block.

The above equation is based on one radio frame, and a PBCH is mapped to four subframes during 40 ms, that is, in four consecutive radio frames. According to the above equation, a PBCH is mapped to physical resources using 4 OFDM symbols and 72 subcarriers within one subframe.

According to Section 6.2 of 3GPP TS 36.331 V8.4.0 (2008-12), an MIB is defined as in the following table.

TABLE 1

```
MasterInformationBlock ::= SEQUENCE {
    dl-Bandwidth            ENUMERATED {
                                n6, n15, n25, n50, n75, n100, spare2, spare1},
    phich-Configuration     PHICH-Configuration,
    systemFrameNumber           BIT STRING (SIZE (8)),
    spare                       BIT STRING (SIZE (10))
}
```

'dl-Bandwidth' is a system bandwidth, and 'systemFrameNumber' is an SFN (system frame number). 'phich-Configuration' includes a PHICH (Physical Hybrid automatic repeat request Indicator Channel) duration and PHICH resources. The PHICH duration indicates the number of OFDM symbols through which the PHICH is transmitted in a subframe. The PHICH resources are used to determine the number of PHICH groups in a subframe.

As described above, when a UE receives an MIB through the PBCH, a system bandwidth, an SFN, and PHICH configuration can be known. Furthermore, a UE is informed of the number of transmission antennas of a BS by additionally masking the CRC (Cyclic Redundancy Check) of an MIB and a masking sequence shown in the following table.

TABLE 2

| NUMBER OF TRANSMISSION ANTENNAS OF BS | MASKING SEQUENCE |
|---|---|
| 1 | <0, 0, 0, 0, 0, 0, 0, 0, 0, 0, 0, 0, 0, 0, 0, 0> |

TABLE 2-continued

| NUMBER OF TRANSMISSION ANTENNAS OF BS | MASKING SEQUENCE |
|---|---|
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

3GPP LTE uses three masking sequences, such as those shown in Table 2, because it supports a maximum of four transmission antennas in downlink.

If 8 transmission antennas are used, a masking sequence, such as <1, 0, 1, 0, 1, 0, 1, 0, 1, 0, 1, 0, 1, 0, 1, 0>, may be further defined and used. A new masking sequence may be determined as a masking sequence for the number of the existing 1, 2, or 4 antennas and a sequence having the greatest distance. The related sequence needs not to be necessarily used to inform 8 and may be used to inform the number of antennas greater than 4.

If the additional masking sequence as described above is used, an LTE UE cannot decode an MIB masked using the additional masking sequence. Accordingly, if the additional masking sequence is used to transmit the MIB of a specific carrier, the specific carrier may be configured as a non-compatibility carrier which is not used by an LTE UE.

Additional information elements included in an MIB, proposed by the present invention, are now described.

As described above, the MIB includes pieces of essential information that must be known by a UE for communication between the UE and a BS, such as a system bandwidth, an SFN, a PHICH configuration, and the number of transmission antennas. The existing defined MIB includes an extra 10-bit field. If the additional information elements are defined in the extra bits, backward compatibility with the existing 3GPP LTE can be guaranteed.

In the existing LTE system, cell-specific system information is transmitted through a PBCH because only one carrier is used in uplink and downlink. If uplink carriers or multiple carriers or both are used, however, cell-specific system information or carrier-specific system information or both can be transmitted through the PBCH. The carrier-specific system information is multiple carrier information related to a multiple carrier operation between a UE and a BS and may be system information different by each carrier.

The information elements which may be further defined in the MIB are as follows.

(1) Information about an available (or unavailable) carrier from among a plurality of carriers. This information may be indicated by the index of a carrier or may be indicated in a bitmap form.

(2) Information about cell-specific carrier configuration. This information may be information about the number of carriers or a center frequency. If synchronization information about one of a plurality of carriers is obtained, synchronization information about the remaining carriers can be obtained based on the above information. Accordingly, since synchronization signals for all the carriers need not to be searched for, synchronization can become fast and the power consumption of a UE can be reduced.

(3) The type of a carrier. The carrier may be divided into a compatibility carrier and a non-compatibility carrier according to whether it supports backward compatibility for LTE. The type of a carrier indicates whether each carrier is a compatibility carrier or a non-compatibility carrier. Alternatively, in order to increase the data rate, a synchronization signal or an extension carrier through which a PBCH is transmitted may be defined. The type of a carrier may indicate whether each carrier is an extension carrier.

(4) A non-PHICH indicator. A PHICH is a channel for carrying HARQ ACK/NACK signals for uplink data. The non-PHICH indicator disregards a PHICH configuration on a PBCH and designates a carrier (or a subframe) through which a PHICH is not transmitted. The PHICH is transmitted through a downlink carrier through which uplink allocation is received. Accordingly, a DCI format (e.g., a DCI format 0) including uplink allocation may not be monitored in a carrier set by the non-PHICH indicator.

(5) A related downlink carrier index is transmitted through a PBCH in an initial access process, such as a random access process, after cell search so that through what carrier does a UE perform initial access.

(1) to (5) may be said to be pieces of carrier information related to a multiple carrier operation between a UE and a BS.

(6) Information indicating a subframe for LTE-A of a new format not compatible with the existing LTE or a subframe for a relay.

(7) A transmission antenna field. The transmission antenna field is information which is used for a BS to inform a UE of the number of transmission antennas used for downlink transmission. Up to four transmission antennas can be informed through the masking sequence of the existing PBCH. A BS may use the transmission antenna field in order to inform the number of transmission antennas greater than 4. If the number of transmission antennas is N, the transmission antenna field may have ceil (N) bits. Alternatively, the transmission antenna field may have ceil (N) bits or less, and UEs may obtain the number of added transmission antennas by combining pieces of information obtained through PBCH demasking. Accordingly, there is an advantage in that backward compatibility with the existing LTE UE can be guaranteed, as compared with a case where a new masking sequence is used.

(8) PHICH-related information for an LTE-A UE. An additional PHICH-related parameter may be defined in addition to the existing PHICH duration or PHICH resources.

(9) Information about a system version. The information about a system version, included in an MIB, is used to inform how the SIB is configured. For example, if a system version indicates a legacy system, such as LTE, the SIB may be configured according to a method defined in the existing system. If a system version indicates a newly defined system, such as LTE-A, the SIB may be configured unlike the existing SIB or may be added to the existing SIB and configured in order to inform an SIB of a modified form.

(10) The type of a relay or the type of a femto cell

(11) Indicator or a CoMP (Coordinated Multi-Point transmission) type for a CoMP possible mode At least one of the proposed contents (1) to (10) may be included in an MIB and transmitted through a PBCH. The additional contents may also be transmitted through a secondary PBCH.

When a PBCH is configured as described above, cell-specific scrambling is performed. To this end, a scramble sequence is reset on the basis of a cell ID. If data is transmitted or received through multiple carriers in one cell and all or most of the bits of the PBCH transmitted through each carrier are identical, a PAPR (Peak-to-Average Power Ratio) may be increased. If multiple carriers are used in one cell, carrier-specific scrambling may be performed in order to reduce a downlink PAPR.

For the carrier-specific scrambling, a scramble sequence may be reset on the basis of at least any one of a carrier index, a cell ID, and a combination of them. If the carrier-specific scrambling is used, the existing LTE UE cannot receive the PBCH. Accordingly, the carrier-specific scrambling is used only in an LTE-A-dedicated carrier, or the carrier-specific scrambling of a relevant PBCH may be used so that an LTE UE does not use a related carrier in a mixed carrier which can support both an LTE UE and an LTE-A UE.

The structure of a secondary PBCH (S-PBCH) proposed according to the present invention is described below.

In an LTE-A system, various pieces of system information are required with the introduction of multiple carriers, MIMO of a higher order, a relay, and a new scheme, such as CoMP. A broadcast channel used in extended system information for LTE-A is called the S-PBCH.

Like the PBCH, the S-PBCH may be transmitted during a 40 ms cycle or in a cycle of 20 ms or 80 ms.

The frequency domain through which the S-PBCH is transmitted can use 72 subcarriers of a system bandwidth, as in the existing PBCH. The number of used subcarriers is not limited. If the same number of subcarriers as that of the existing PBCH, PSS, or SSS is used, there are advantages in that the remaining subcarriers can be easily scheduled for other purposes and wasted resources can be minimized.

The S-PBCH can be transmitted through the first subframe of a radio frame through which the existing PBCH, PSS, and SSS are transmitted. As described above, in the subframe through which the PBCH is transmitted, the PSS and the SSS are transmitted the two OFDM symbols of a previous slot. Alternatively, the S-PBCH can be transmitted through a sixth subframe through which the PSS and the SSS are transmitted.

Figure 4:
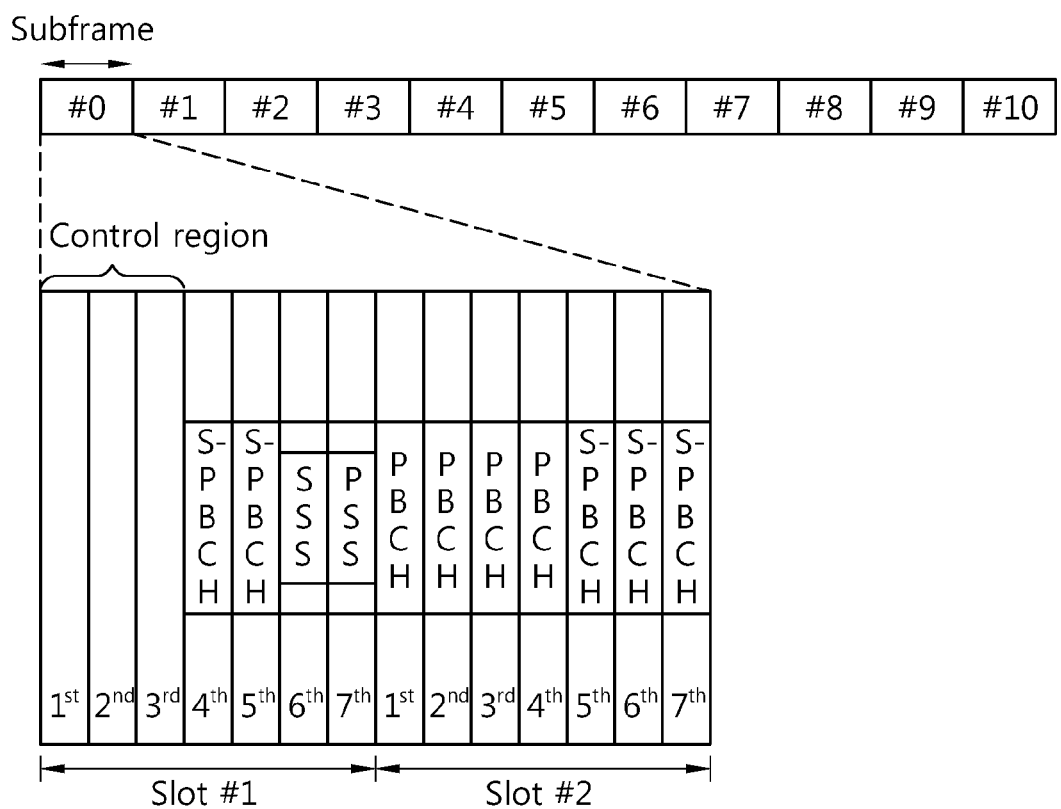
FIG. 4 shows an example of S-PBCH transmission.

FIG. 4 shows an example of S-PBCH transmission. The S-PBCH is transmitted through the first subframe of a radio frame. The S-PBCH may be transmitted through at least one of the remaining OFDM symbols other than the former 3 OFDM symbols of the first subframe and 6 OFDM symbols used to transmit an SSS, a PSS, and PBCHs, from among the plurality of OFDM symbols. All the remaining OFDM symbols may be used to transmit the S-PBCH or one or more of the remaining OFDM symbols may be used to transmit the S-PBCH.

Figure 5:
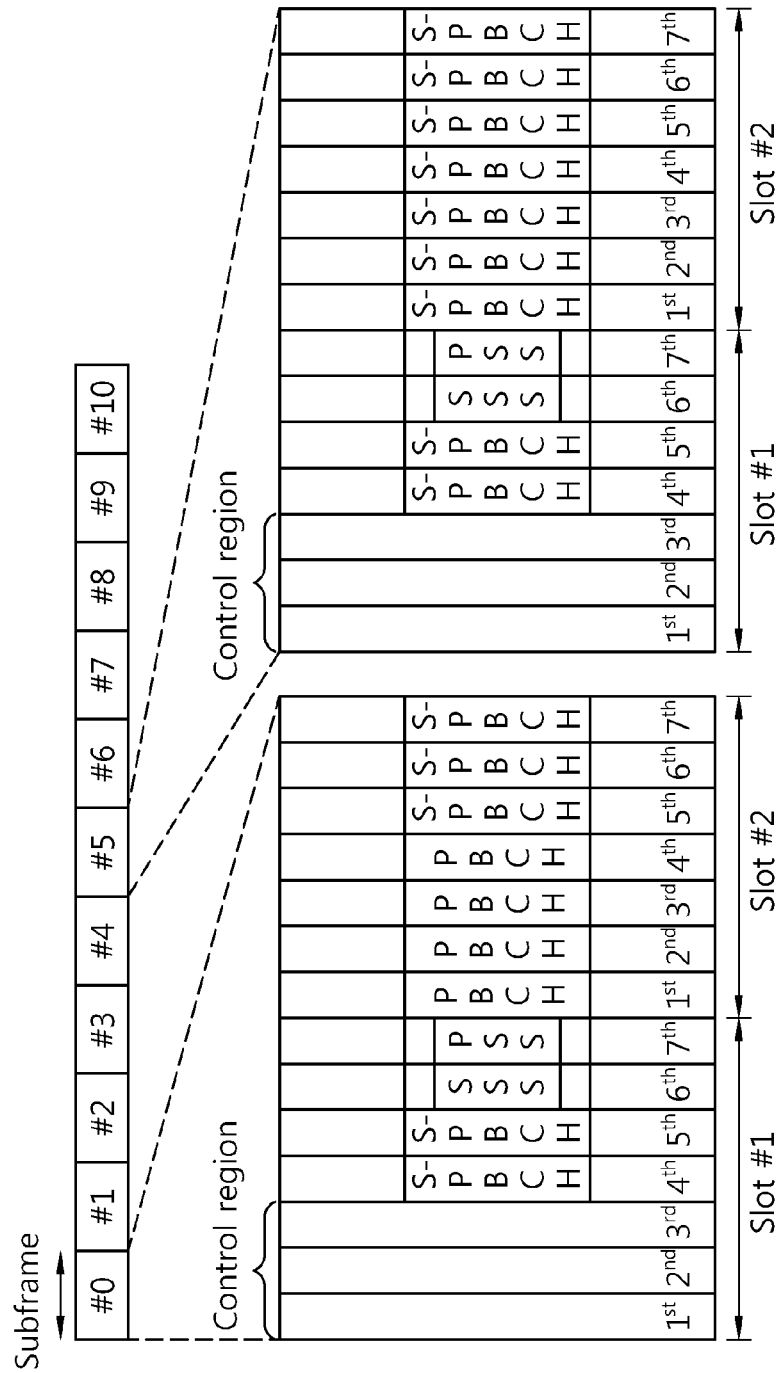
FIG. 5 shows another example of S-PBCH transmission.

FIG. 5 shows another example of S-PBCH transmission. This example shows that the S-PBCH is transmitted through not only the first subframe, but also the sixth subframe of a radio frame. Since a PBCH is not transmitted through the sixth subframe, a maximum of 9 OFDM symbols may be used to transmit the S-PBCH in the sixth subframe. All the remaining OFDM symbols may be used to transmit the S-PBCH or one or more of the remaining OFDM symbols may be used to transmit the S-PBCH.

Figure 6:
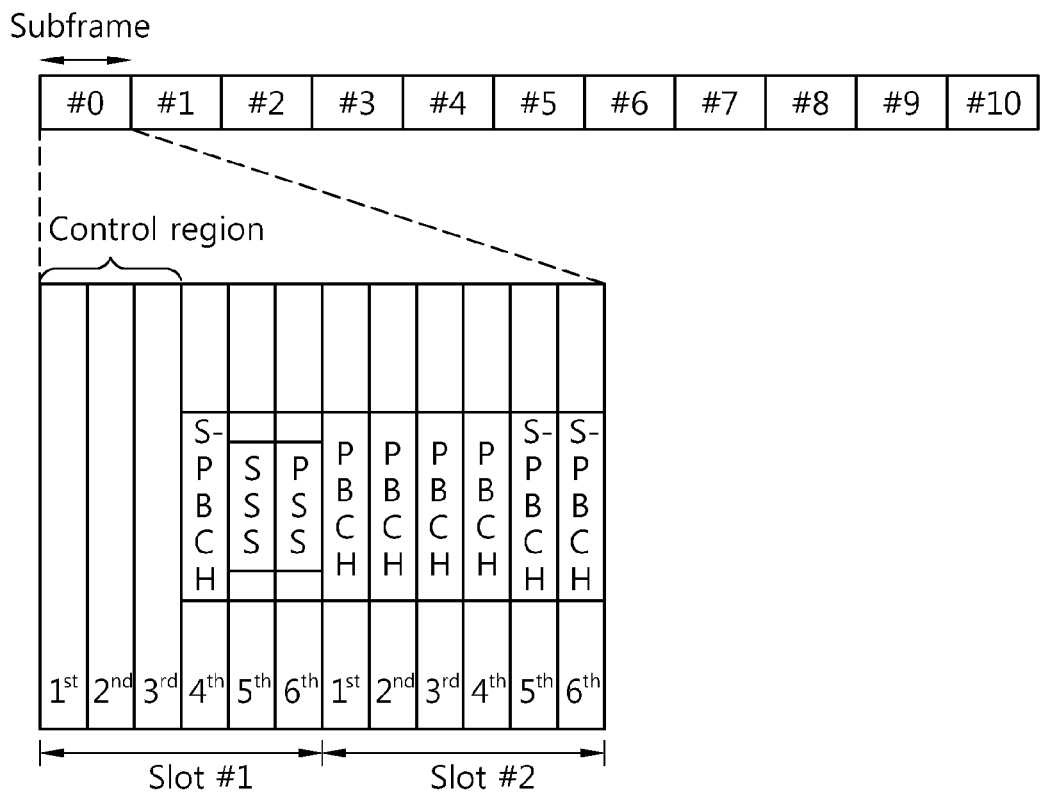
FIG. 6 shows yet another example of S-PBCH transmission.
Figure 7:
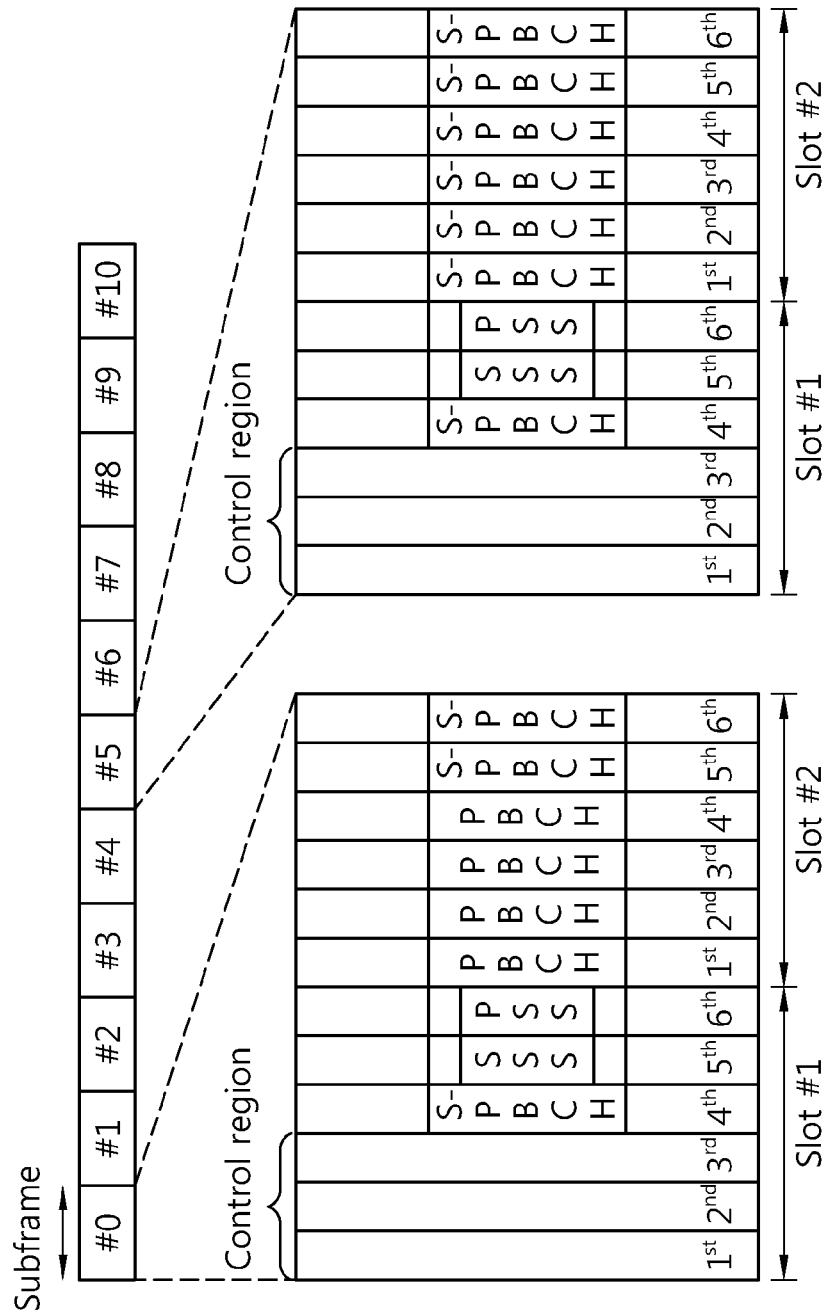
FIG. 7 shows further yet another example of S-PBCH transmission.

FIGS. 4 and 5 disclose applications to a normal CP (Cyclic Prefix) in which 7 OFDM symbols are included in one slot. FIGS. 6 and 7 disclose applications to an extended CP in which 6 OFDM symbols are included in one slot. The embodiments of FIGS. 6 and 7 are identical with the embodiments of FIGS. 4 and 5 except the total number of OFDM symbols per subframe.

The reason why the PBCH, the PSS, and the SSS use 72 subcarriers is that the PBCH, the PSS, and the SSS can be received and transmitted in a 1.25 MHz narrowband system. In the embodiments of FIGS. 4 to 7, in a narrowband system, resources for data channels may be insufficient in a subframe through which the S-PBCH is transmitted. In this case, the number of OFDM symbols used to transmit the S-PBCH may be restricted.

Although the S-PBCH is transmitted through the first or sixth subframe in the above example, the position of the subframe or the number of subframes used to transmit the S-PBCH is not limited.

If the S-PBCH is an additional broadcast channel for an LTE-A UE and can be transmitted in a data region in which shared channels can be transmitted, backward compatibility is guaranteed. This is because an LTE UE has only to be scheduled so that it does not use a region in which the S-PBCH is transmitted.

Figure 8:
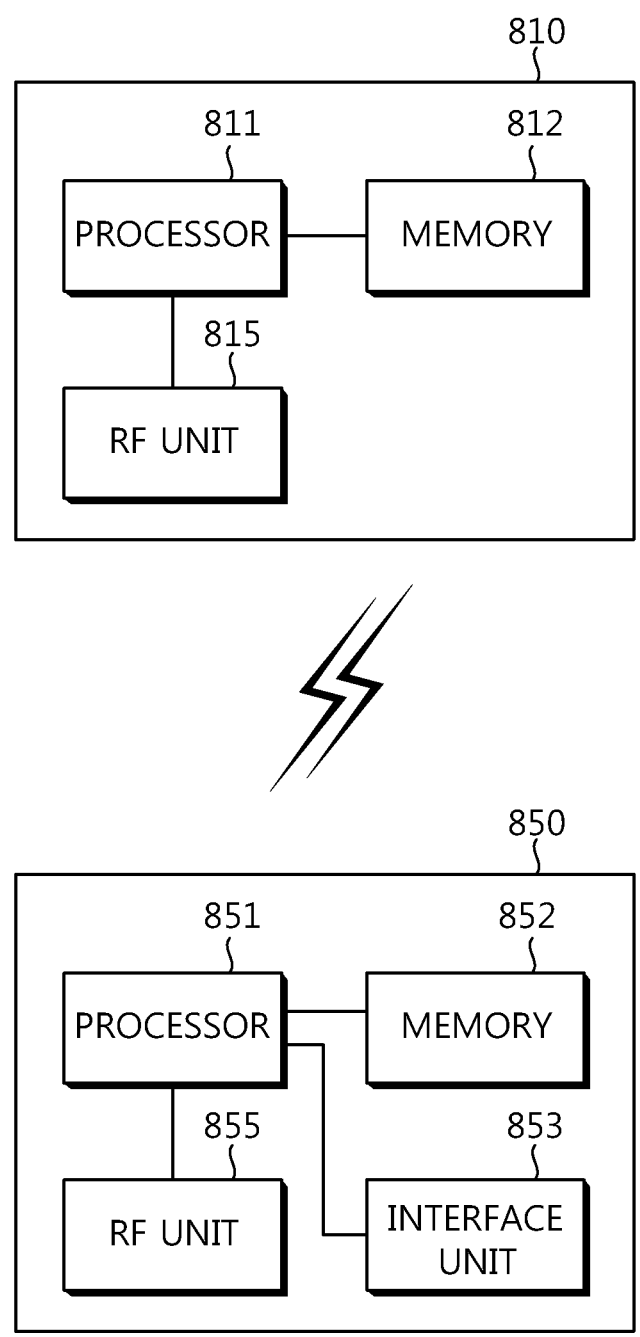
FIG. 8 is a block diagram showing a wireless communication system in which embodiments of the present invention are implemented.

FIG. 8 is a block diagram showing a wireless communication system in which embodiments of the present invention are implemented. A BS 810 is a wireless apparatus which configures and transmits system information. A UE 850 is a wireless apparatus which accesses the BS 810 based on received system information.

The BS 810 includes a processor 811, memory 812, and an RF (Radio Frequency) unit 815. The processor 811 is coupled to the memory 812 and the RF unit 815. The process or 811 configures system information and transmits the system information through a broadcast channel. The processor 811 implements the above-described functions, processes, and/or methods. The memory 812 is coupled to the processor 811 and configured to store various pieces of information for driving the processor 811. The RF unit 815 is coupled to the processor 811 and configured to transmit and/or receive a radio signal.

The UE 850 includes a processor 851, memory 852, an interface unit 853, and an RF unit 855. The processor 851 is coupled to the memory 852, the interface unit 853, and the RF unit 855. The processor 851 receives the system information from the BS 810 and communicates with the BS 810 based on the received system information. The memory 852 is coupled to the processor 851 and configured to store various pieces of information for driving the processor 851. The interface unit 853 includes an input device, a display, etc. for an interface with a user. The RF unit 855 is coupled to the processor 851 and configured to transmit and/or receive a radio signal.

The processor 811, 851 can include an Application-Specific Integrated Circuit (ASIC), other chipsets, a logic circuit and/or a data processor. The memory 812, 852 may include Read-Only Memory (ROM), Random Access Memory (RAM), flash memory, a memory card, a storage medium and/or other storage devices. The RF unit 815, 855 includes a baseband circuit for processing the radio signal. When the embodiments are implemented in software, the above schemes may be implemented using a module (process, function or the like) which performs the above functions. The module can be stored in the memory 812, 852 and executed by the processor 811, 851. The memory 812, 852 may be placed inside or outside the processor 811, 851 and connected to the processor 811, 851 through a variety of well-known means.

In the above-described exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A base station comprising:
a radio frequency unit; and
a processor coupled to the radio frequency unit and configured to
transmit cell-specific system information through a first broadcast channel,
wherein the cell-specific system information comprises
information on system bandwidth,
information on system frame number (SFN), and
configuration information on Physical Hybrid automatic repeat request (HARQ) Indicator Channel (PHICH); and
transmit carrier-specific system information through a second broadcast channel,
wherein the carrier-specific system information comprises multiple carrier information related to a multiple carrier operation,
wherein the first broadcast channel
is a Physical Broadcast Channel (PBCH),
is scrambled with a first sequence generated based on a cell ID, and
is transmitted on a $1^{st}$ subframe among 10 subframes of a radio frame, and
wherein the second broadcast channel
is a Secondary Physical Broadcast Channel (S-PBCH),
is scrambled with a second sequence generated based on a carrier index, and
is transmitted on a $6^{th}$ subframe among the 10 subframes of the radio frame.

2. The base station of claim 1, wherein the multiple carrier information comprises at least one of a number of multiple carriers which are used by a system, a carrier index, and a type of a carrier.

3. The base station of claim 1, wherein the multiple carrier information comprises a non-Physical Hybrid automatic repeat request (HARQ) Indicator Channel (PHICH) indicator indicating a carrier through which a PHICH used to transmit a downlink HARQ ACK/NACK signal is not transmitted.

4. The base station of claim 1, wherein the carrier-specific system information comprises a number of transmission antennas used for downlink transmission.

5. The base station of claim 1, wherein a subframe comprises a plurality of orthogonal frequency division multiplexing (OFDM) symbols, and the S-PBCH is transmitted through at least one of remaining OFDM symbols from among the plurality of OFDM symbols except for OFDM symbols used to transmit an secondary synchronization signal (SSS) and a primary synchronization signal (PSS).

6. A user equipment comprising:
a radio frequency unit; and
a processor coupled to the radio frequency unit and configured to
receive cell-specific system information through a first broadcast channel,
wherein the cell-specific system information comprises
information on system bandwidth,
information on system frame number (SFN), and
configuration information on Physical Hybrid automatic repeat request (HARQ) Indicator Channel (PHICH),
receive carrier-specific system information through a second broadcast channel, and
communicate with a base station based on the cell-specific system information and the carrier-specific system information,
wherein the carrier-specific system information comprises multiple carrier information related to a multiple carrier operation,
wherein the first broadcast channel
is a Physical Broadcast Channel (PBCH),
is scrambled with a first sequence generated based on a cell ID, and
is received on a $1^{st}$ subframe among 10 subframes of a radio frame, and
wherein the second broadcast channel
is a Secondary Physical Broadcast Channel (S-PBCH),
is scrambled with a second sequence generated based on a carrier index, and
is received on a $6^{th}$ subframe among the 10 subframes of the radio frame.

7. The user equipment of claim 6, wherein a subframe comprises a plurality of orthogonal frequency division multiplexing (OFDM) symbols, and the S-PBCH is transmitted through at least one of remaining OFDM symbols from among the plurality of OFDM symbols except for OFDM symbols used to transmit an secondary synchronization signal (SSS) and a primary synchronization signal (PSS).

8. A communication method comprising:
transmitting cell-specific system information through a first broadcast channel,
wherein the cell-specific system information comprises
information on system bandwidth,
information on system frame number (SFN), and
configuration information on Physical Hybrid automatic repeat request (HARQ) Indicator Channel (PHICH); and
transmitting carrier-specific system information through a second broadcast channel, the carrier-specific system information comprising multiple carrier information related to a multiple carrier operation,
wherein the first broadcast channel
is a Physical Broadcast Channel (PBCH),
is scrambled with a first sequence generated based on a cell ID, and
is transmitted on a $1^{st}$ subframe among 10 subframes of a radio frame, and
wherein the second broadcast channel
is a Secondary Physical Broadcast Channel (S-PBCH),
is scrambled with a second sequence generated based on a carrier index, and
is transmitted on a $6^{th}$ subframe among the 10 subframes of the radio frame.

* * * * *